United States Patent
Condon et al.

[15] 3,706,438
[45] Dec. 19, 1972

[54] VALVE OPERATING MECHANISM
[72] Inventors: James A. Condon, Gaston; Charles W. Rothhaar, Muncie, both of Ind.
[73] Assignee: Maxon Pro-Mix Burner Corporation, Muncie, Ind.
[22] Filed: Jan. 13, 1971
[21] Appl. No.: 106,114

[52] U.S. Cl. ..................251/251, 74/89, 74/99, 74/568 R, 74/568 FS
[51] Int. Cl. ...............................F16k 31/52
[58] Field of Search......251/251, 215, 228, 229, 250, 251/304, 308; 74/568 FS, 568 R, 89, 99

[56] References Cited

UNITED STATES PATENTS

| | | | |
|---|---|---|---|
| 2,315,171 | 3/1943 | Voorheis | 251/253 |
| 2,286,173 | 6/1942 | Maxon | 74/568 FS |
| 1,525,052 | 2/1925 | Spotz | 74/568 FS |

Primary Examiner—Edgar W. Geoghegan
Assistant Examiner—David R. Matthews
Attorney—Hume, Clement, Hume & Lee

[57] ABSTRACT

An operating mechanism for controlling the movement of a valve element. The mechanism includes support means movable in response to the rotation of a driving shaft means. The support means has a plurality of adjusting means connected thereto and arranged along a predetermined path thereon. A continuous deformable channel having a pair of opposed cam surfaces is defined by means connected to the adjusting means. A follower means is positioned in the channel so as to follow each of the cam surfaces. The cam surfaces translate the follower means in converse directions in response to the rotation of the driving shaft means. Connecting means join the follower means with a valve element that moves between an open and a closed position in response to the translation of the follower means.

14 Claims, 4 Drawing Figures

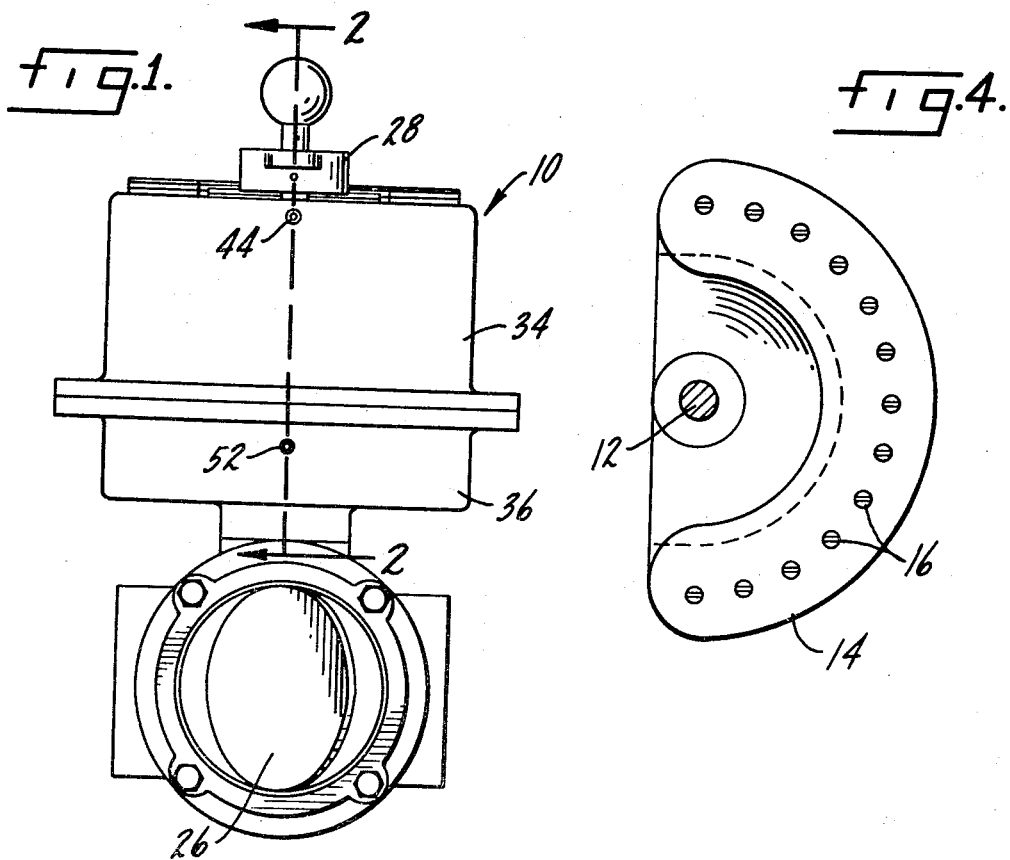
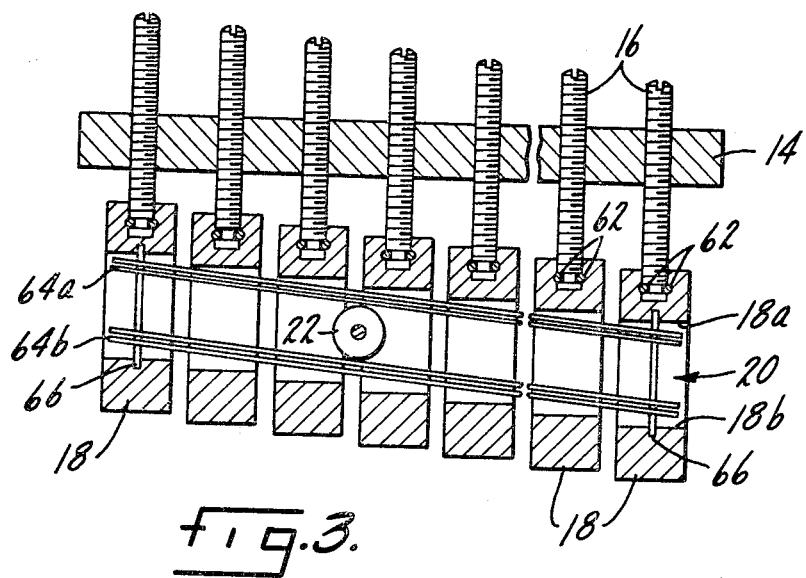

VALVE OPERATING MECHANISM

BACKGROUND OF THE INVENTION

This invention relates to valve operating mechanisms. It deals more particularly with a valve operating mechanism of the adjustable gradient type.

Valve operating mechanisms are presently used to coordinate the volumetric flow of a gas-air mixture or a liquid-air mixture. An instance of such control would be the control of the proportioning of liquid fuel and air in order to obtain the best possible combustion of fuel for use in industrial furnaces and ovens.

Heretofore, valve operating mechanisms have provided a return spring for the purposes of returning a valve closure element to its normal position, such as described in U.S. Pat. No. 2,315,171. However, the stem of the valve may become fouled, thus, negating much of the force of the closing spring. The use of a heavier spring to counter this condition necessitates the use of excessive force to position the valve closure element in any position other than that which is normal for the valve.

SUMMARY OF THE INVENTION

It is an object of the present invention to provide a valve operating mechanism which contains an adjustable cam that delivers a positively-forced movement to the valve closure element in both the opening and closing directions. It is another object to provide a valve operating mechanism of this type which is invulnerable to mechanical failure due to the existence of foreign matter in the ambient air.

The foregoing and other objects are realized in accord with the invention by providing a valve operating mechanism comprising support means movable in response to the rotation of a driving shaft means. The support means has a plurality of adjusting means such as screws connected thereto and arranged along a predetermined path thereon. A continuous deformable channel having a pair of opposed cam surfaces is defined by means connected to the adjusting means. A follower means is positioned in the channel so as to follow each of the cam surfaces. The cam surfaces translate the follower means in converse directions in response to the rotation of the driving shaft means. Connecting means join the follower means with a valve element that moves between an open and a closed position in response to the translation of the follower means.

BRIEF DESCRIPTION OF THE DRAWINGS

FIG. 1 is a front view of a valve operating mechanism in accordance with this invention mounted on a valve mechanism;

FIG. 3 is a side view in section of a fragmentary portion of the deformable channel and the adjustable cam tracks or surfaces of the valve mechanism of FIG. 1; and FIG. 4 is a top view of the support member of the valve mechanism of FIG. 1.

DESCRIPTION OF THE PREFERRED EMBODIMENT

Figure 2:
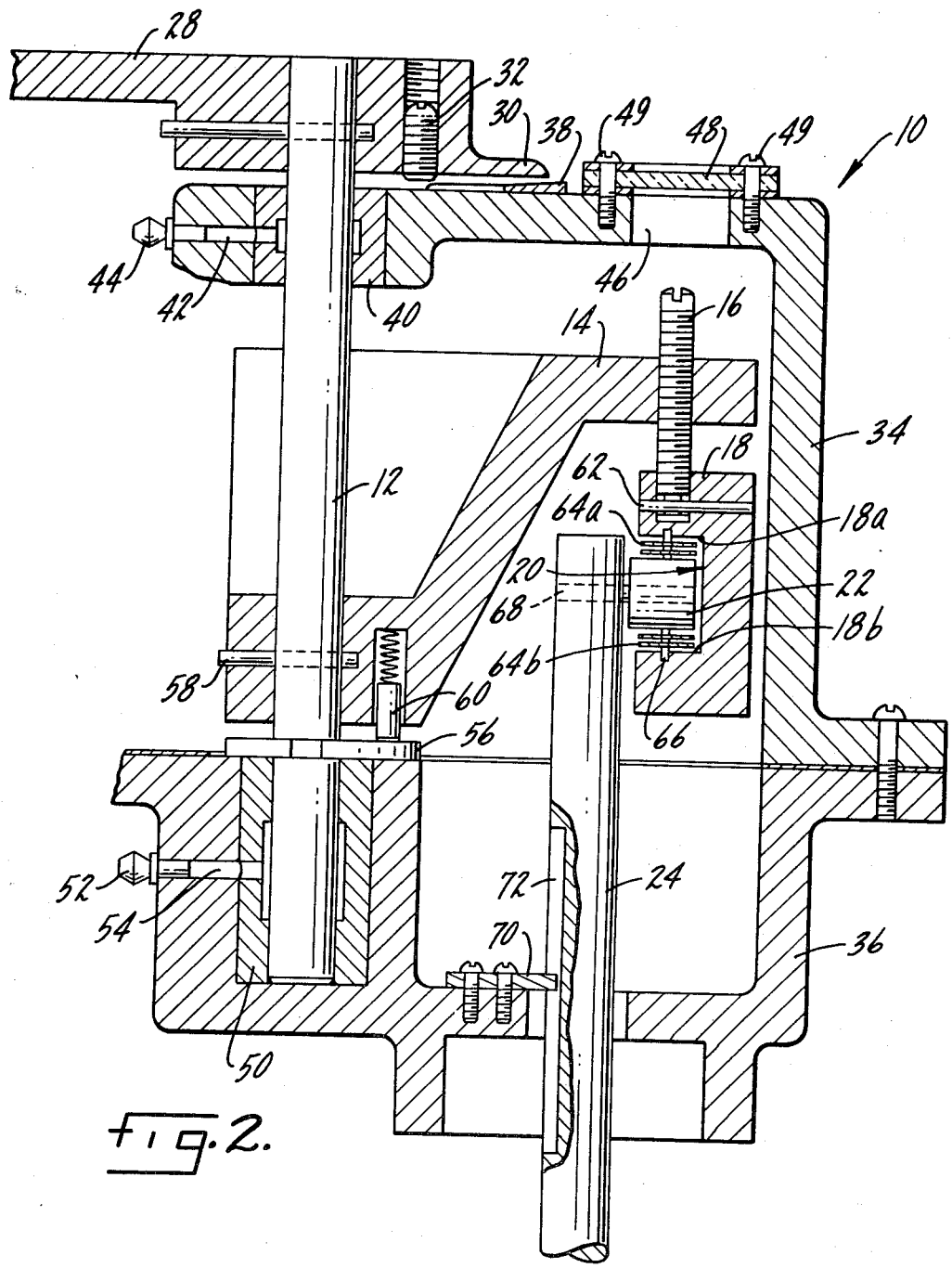
FIG. 2 is a longitudinal section along line 2—2 of FIG. 1 of a valve operating mechanism.

Referring now to the drawings, a valve operating mechanism embodying the preferred features of the present invention is illustrated at 10. The valve mechanism 10 includes a rotatable driving shaft 12 having a support member 14 connected thereto. Adjusting screws 16 are arranged on the support member 14 along a predetermined path, preferably in a circular pattern about the center line of the driving shaft 12. A deformable channel 20 is affixed to the adjusting screws 16. The channel 20 is formed by a plurality of adjacent open channel segments, such as the C-shaped segments 18. Each segment 18 defines a pair of opposed cam surfaces 18(a) and 18(b) which produce the channel 20. Each C-shaped segment 18 also is attached to an adjusting screw 16 so that a change in the slope or contour of the channel 20 can be accomplished by imparting a rotational movement to one or more adjusting screws 16 which conveys a translating movement in one or more C-shaped segments 18.

A follower 22, preferably a roller, is positioned in the channel 20 so as to follow each of the cam surfaces 18(a) and 18(b). The cam surfaces translate the follower 22 with positively-forced movement in converse directions in response to the rotation of the driving shaft 12. A driven shaft 24 joins the follower 22 to a valve element 26. The driven shaft 24 imparts the translating movement of the follower 22 to a valve element so as to move the valve element between an open and a closed position.

In the illustrated embodiment the valve assembly 10 is arranged to position the shafts 12 and 24 vertically, and to open the valve element 26 when the shaft 24 is driven downward by the force imparted to the follower 22 by the channel 20. The valve element is similarly closed when the shaft 24 is driven upward by the force imparted to the follower 22 by the channel 20.

Considering the valve operating mechanism 10 in more detail, FIG. 2 shows the valve operating mechanism 10 totally enclosed by an upper housing 34 and a lower housing 36. Such an enclosure prevents the exposure of the internal moving parts to any potentially harmful foreign matter which may become airborne in the ambient conditions surrounding the valve operating mechanism.

The driving shaft 12 protrudes through the upper housing 34 and the driven shaft 24 protrudes through the lower housing 36. The protruding portion of the driving shaft 12 has a drive crank 28 affixed thereto to facilitate rotational movement of the driving shaft 12. The force to impart rotational movement to the driving shaft 12 may be applied manually or automatically by using either a pneumatic, hydraulic, or an electric operator mechanically linked to the drive crank 28. If the driving shaft 12 is to be manually controlled, a lock screw 32 may be provided to secure the shaft 12 and the channel 20 in a predetermined position. The screw 32 is threaded through the drive crank 28, and may be turned so as to make contact with the upper housing 34 and hold the driving shaft 12 in a stationary position. The drive crank 28 is constructed so as to have a protruding portion 30 thereon which serves as a pointer for visually indicating the rotational position of the channel 20. An indication of the rotational position of the channel 20 will indicate the degree of valve opening for a selected contour of the channel 20. To aid in the visual indication of the position of channel 20, a circular scale 38 can be mounted immediately beneath the indicator 30 and attached in a permanent manner to the upper housing 34.

The upper housing 34 also contains a bearing 40 in which the driving shaft 12 may turn. The bearing 40 can be lubricated through a greaseway 42 which communicates with a grease fitting 44. Access for adjustment of the screws 16 and external observation of the internal parts of the valve operating mechanism 10 may be provided by constructing an aperture 46 in the housing 34 and positioning a properly sealed and gasketed glass 48 over the aperture 46. The glass 48 may be secured to the housing 34 in any convenient manner to allow removal thereof, such as by screws 49, as shown in FIG. 2.

The lower housing 36 contains a bearing 50 which is greased externally by means of a grease fitting 52 and a greaseway 54. The bearings 40 and 50 confine the shaft 12 to rotational movement. A retainer ring 56, engaged in a groove in the shaft 12, denies any excessive translating movement to the driving shaft 12, and is affixed in a permanent manner to the lower housing 36 by any suitable means, such as screws or rivets. A peg 70 is attached to the lower housing by any suitable means, such as screws, and protrudes to ride within a groove 72 in the driven shaft 24. Thus, only vertical translating movement of the driven shaft 24 is permitted, and likewise only vertical translating movement of the follower 22 is permitted.

As shown in FIG. 2, the support member 14 is affixed securely to the driving shaft 12, preferably by a shaft pin 58. The support member 14 may contain a brake and spring, indicated generally at 60, which provides stabilization to the supporting member 14 by denying any excessive translating movement.

Any number of adjusting screws 16 may be threaded to the support member 14. In the preferred embodiment the screws 16 are arranged in a circular arc about the center line of the driving shaft 12. The more screws 16 that are arranged in a given arc the finer the adjustment of the channel 20. The circular arc may also be greater or less than the preferred 180° as shown in FIG. 4.

Any tendency on the part of the adjusting screws 16 to loosen due to vibration or other causes can be successfully countered by the use of non-threaded soft inserts in the screws or by the addition of set screws.

The C-shaped segments 18, form the channel 20 so that it has a pair of opposed cam surfaces, are attached to each of the adjusting screws 16, preferably by the use of retaining pins 62. The rotational movement of the adjusting screws 16 is not inhibited by either the retaining pins 62 or by the C-shaped segment 18.

All of the adjusting screws 16 are threaded through the support member 14 so that when rotational movement is imparted to an adjusting screw 16, as might be done with an ordinary screwdriver, the result is a corresponding translating movement of the attached C-shaped segment 18. If an adjusting screw 16 is turned in (clockwise), the attached C-shaped segment 18 will be lowered, and conversely, if an adjusting screw 16 is turned out (counter-clockwise), the attached C-shaped segment 18 will be raised. Thus, a series of adjusting screws 16 may each be individually adjusted to cause the attached C-shaped segments 18 to shape the channel 20 in any one of a variety of contours. The channel 20 may take any form within the confines of the support member 14.

As the C-shaped segments 18 form "steps" in the channel 20 when they are adjusted at different elevations, flexible springs 64(a) and 64(b) are positioned on each of the cam surfaces 18(a) and 18(b) of the channel 20 to bridge across these steps. The springs 64(a) and 64(b) are denied lateral movement by suitable means such as retaining pins 66, one of which is located in the first C-shaped segment 18 and the other of which is located in the last C-shaped segment 18.

The follower 22, positioned within the channel 20, rides on the flexible springs 64(a) and 64(b) and is forcibly translated in converse directions by the cam surfaces 18(a) and 18(b) in response to rotation of the driving shaft 12. More specifically, the upper spring 64(a) forcibly urges the follower 22 downward, and the lower spring 64(b) forcibly urges the follower upward, when the driving shaft 12 is rotated. The follower 22 is designed for rotational movement and is permanently affixed to the driven shaft 24 by a pin 68 or any other suitable means. The driven shaft 24 joins the valve element 26 to the follower 22 and imparts the translating movements of the follower 22 to the valve element 26 so that the valve element 26 is moved between an open and a closed position.

In the illustrated embodiment the valve assembly 10 is arranged to position the shafts 12 and 24 vertically. A rotational movement of the driving shaft 12 results in a vertical translating movement of the driven shaft 24 by having the cam surfaces of the channel 20 drive the follower 22 upward and downward. The upward and downward movement of the follower 22 is imparted to the valve element 26 by the driven shaft 24 and by this movement the valve element 26 opens and closes.

While the preferred embodiment of the present invention has been shown and described herein, it is obvious that many structural details may be changed without departing from the spirit and scope of the appended claims.

We claim:

1. A valve operating mechanism for controlling a valve element movable between an opened and a closed position comprising:
   a. rotatable driving shaft means;
   b. support means movable in response to rotation of said driving shaft means;
   c. adjusting means arranged along a predetermined path on said support means;
   d. means connected to said adjusting means to define a continuous deformable channel having a pair of opposed cam surfaces;
   e. follower means positioned in said channel and adapted to follow each of said cam surfaces so that said cam surfaces translate said follower means in converse directions in response to rotation of said driving shaft means; and
   f. connecting means joining said follower means to said valve element to move said valve element between said open and closed positions in response to said translation of said follower means.

2. A valve operating mechanism in accordance with claim 1 wherein said deformable channel is formed by a plurality of individually adjustable open channel segments aligned along said predetermined path.

3. A valve operating mechanism in accordance with claim 2 wherein bridging means are disposed on each of said cam surfaces between said open channel segments.

4. A valve operating mechanism in accordance with claim 3 wherein said bridging means comprises flexible springs.

5. A valve operating mechanism in accordance with claim 2 wherein said adjusting means comprises a plurality of adjusting screws individually attached to said channel segments.

6. A valve operating mechanism in accordance with claim 4 wherein a rotational movement of one of said adjusting screws causes a translating movement of one of said channel segments and thereby adjusts the contour of the channel.

7. A valve operating mechanism for controlling movement of a valve element between an opened and a closed position comprising:
 a. a rotatable driving shaft;
 b. support means affixed to said driving shaft so as to rotate therewith;
 c. a plurality of adjusting screws arranged along a circular path along said support means;
 d. a plurality of C-shaped channel segments affixed to said adjusting screws and defining opposed cam surfaces which cooperate to form a deformable channel disposed in a circular arc about said driving shaft;
 e. a roller positioned in said channel and adapted to follow each of said cam surfaces so that said cam surfaces translate said roller in converse directions in response to rotation of said driving shaft; and
 f. a driven shaft joining said roller to said valve element to move said valve element between said opened and closed positions in response to said translation of said roller.

8. A valve operating mechanism in accordance with claim 7 wherein flexible springs are disposed on each of said cam surfaces so that said roller can bridge from one of said C-shaped segments to another.

9. A valve operating mechanism in accordance with claim 7 wherein said screws are threaded through said support means.

10. A valve operating mechanism in accordance with claim 7 wherein a rotational movement of one of said adjusting screws causes a translating movement of one of said C-shaped segments, and thereby selectively varies the contour of said cam surfaces.

11. A valve operating mechanism for controlling movement of a valve body comprising:
 shaft means for rotating in response to an input setting;
 camming means for variably programming movement of said valve body, said camming means being affixed to said shaft means for rotation therewith and having a channel, said camming means having segments for forming said channel;
 bridging means disposed in said channel for forming continuous, opposing camming surfaces in said channel, said camming surfaces having a predetermined contour; and
 follower means for engaging said bridging means, said follower means being affixed for translational movement whereby rotation of said shaft means translates said follower means for controlling said valve body.

12. The valve operating mechanism of claim 11 wherein the segments of said camming means for forming said channel comprise a plurality of generally C-shaped elements, each of said elements being individually adjustable to vary the contour of said opposing camming surfaces in said bridging means.

13. The valve operating mechanism of claim 12 wherein said bridging means comprise flexible springs, said springs engaging said C-shaped elements in said camming means.

14 The valve operating mechanism of claim 11 including actuator means for controlling said valve body, said actuator means being coupled to said follower means for translational movement therewith.

* * * * *